US008360825B2

(12) United States Patent
Hsu et al.

(10) Patent No.: US 8,360,825 B2
(45) Date of Patent: Jan. 29, 2013

(54) SLURRY SUPPLY SYSTEM (75) Inventors: Ming-Tzung Hsu, Hsin-Chu (TW); Paul Tan, Hsinchu County (TW); Chih-Chiang Yang, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 1281 days.

(21) Appl. No.: 11/987,623

(22) Filed: Dec. 3, 2007

(65) Prior Publication Data
US 2009/0142995 A1    Jun. 4, 2009

(51) Int. Cl.
*B24B 1/00* (2006.01)

(52) U.S. Cl. ........... 451/60; 451/287; 451/446; 438/692

(58) Field of Classification Search ............ 451/36, 451/60, 65, 285, 287, 446; 438/692, 693
See application file for complete search history.

(56) References Cited

U.S. PATENT DOCUMENTS

| | | | | |
|---|---|---|---|---|
| 5,664,990 A * | 9/1997 | Adams et al. | | 451/60 |
| 5,957,759 A * | 9/1999 | Cardenas et al. | | 451/60 |
| 6,146,246 A * | 11/2000 | Custer et al. | | 451/36 |
| 6,425,802 B1 * | 7/2002 | Custer et al. | | 451/5 |
| 2002/0186613 A1 * | 12/2002 | Hiraoka et al. | | 366/136 |
| 2004/0049301 A1 * | 3/2004 | Kawasaki | | 700/68 |
| 2007/0141845 A1 * | 6/2007 | Hiraoka et al. | | 438/692 |
| 2007/0269983 A1 * | 11/2007 | Sneh | | 438/689 |
| 2008/0017249 A1 * | 1/2008 | Hsu et al. | | 137/240 |

* cited by examiner

*Primary Examiner* — Eileen P. Morgan
(74) *Attorney, Agent, or Firm* — McClure, Qualey & Rodack, LLP (57) ABSTRACT

A slurry supply system with multiple supply modules and a flushing module concurrently coupled to the multiple supply modules is provided. Each supply module includes a slurry reservoir and at least one delivery line connecting to the slurry reservoir, wherein each delivery line is oriented toward a chemical mechanical polishing apparatus. The flushing module includes a flushing liquid reservoir and multiple flushing lines connecting to the flushing liquid reservoir, wherein each flushing line is coupled to each delivery line thereby the flush module can selectively flush one of the delivery lines.

19 Claims, 6 Drawing Sheets

SLURRY SUPPLY SYSTEM

TECHNICAL FIELD

The present invention relates to a system for supplying slurry. More particularly, the present invention relates to an improved slurry supply system with flushing functions, which is particularly adaptable for feeding the slurry to multiple chemical mechanical polishing apparatuses.

BACKGROUND OF THE INVENTION

Chemical mechanical polishing (CMP) is used for semiconductor wafers during the fabrication of integrated circuits. The role of the CMP is to polish or grind down semiconductor wafers in order to obtain a highly planar, scratch-free, and contamination-free surface.

Figure 1:
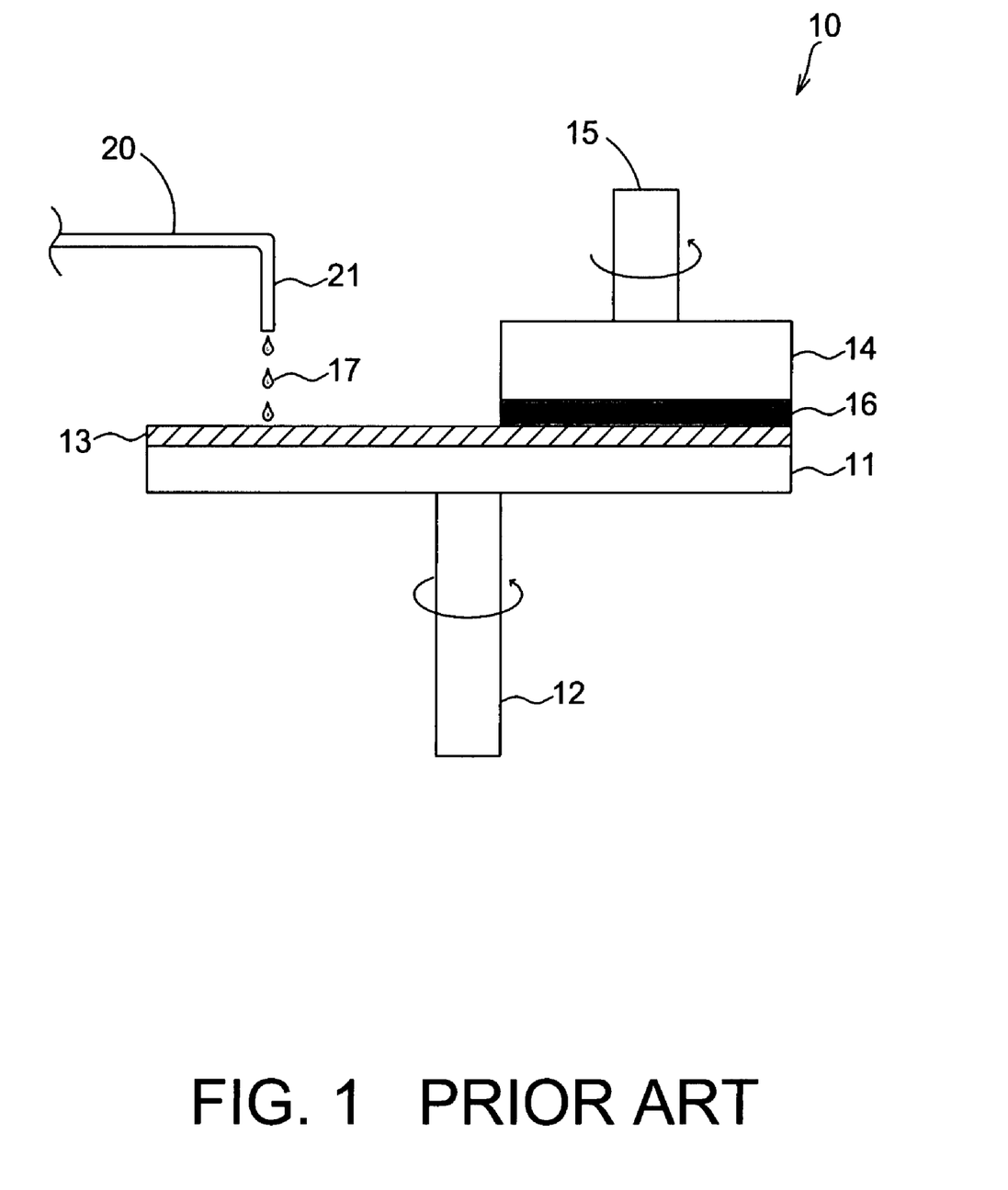
FIG. 1 schematically illustrates a conventional chemical mechanical polishing apparatus.

Illustrated in FIG. 1, a conventional CMP apparatus 10 is illustrated in FIG. 1, which includes a polishing platen 11, a lower drive shaft 12, a polishing pad 13, a carrier 14, and an upper drive shaft 15. The lower drive shaft 12 is provided to rotate the polishing platen 11. The polishing pad 13 is attached onto the polishing platen 11. The upper drive shaft 15 is provided to rotate the carrier 14 on which a wafer 16 to be polished is placed. During polishing, aqueous slurry 17 is dripped onto the polishing pad 13 through a nozzle 21 at the end of a slurry supply system 20. The slurry 17 is a suspension, which contains abrasive particles having a size of approximately 100 nm. The abrasive particles are formed, for example, of silicon oxide, aluminum oxide, or cerium oxide.

Figure 2:
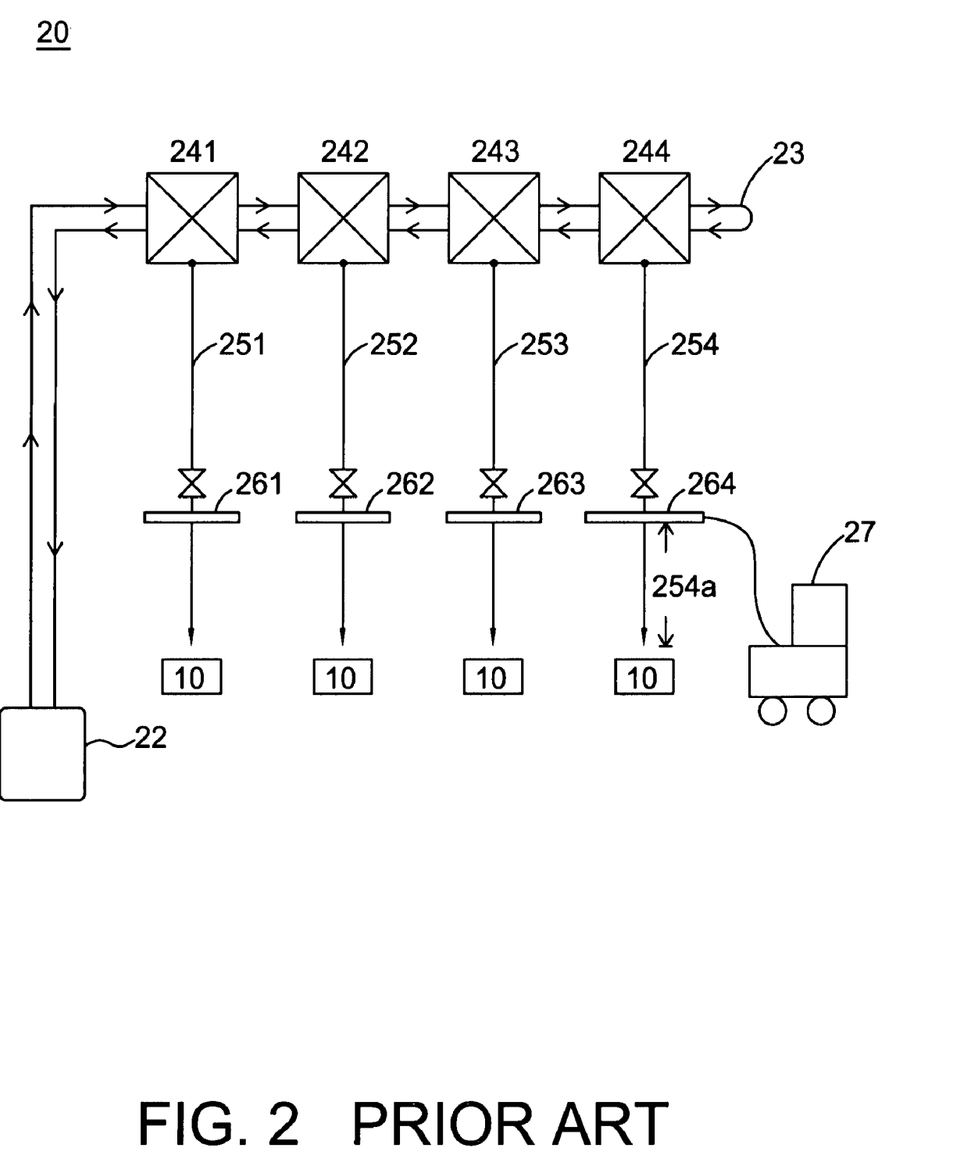
FIG. 2 schematically illustrates a conventional slurry supply system.

A schematic arrangement of the slurry supply system 20 for multiple CMP apparatus 10 is illustrated in FIG. 2. The slurry supply system 20 includes a slurry reservoir 22, a slurry source pipe 23, valve manifold boxes 241-244, delivery lines 251-254, and filters 261-264. The valve manifold boxes 241-244 are provided for introducing the slurry 17 from the slurry source line 23 into the delivery lines 251-254 so as to reach the CMP apparatus 10. The slurry source pipe 23 circulates the slurry 17 thereby suppressing the formation of sedimentation and coagulation of the abrasive particle. The filters 261-264 are provided respectively on the downstream end of the delivery lines 251-254 for blocking the agglomerated particles before entering the CMP apparatus 10. Generally, for preventing the pipelines and the related filters from clogs by the agglomerated particles, the slurry supply system 20 has to be regularly flushed. The method for flushing main circulation loops (e.g. the slurry source pipe 23) has been developed as the disclosure of US Patent Application Publication No.: 2006/0043029 A1, which is incorporated herein by reference. As for flushing of the delivery lines 251-254, it is conventionally conducted one by one through a movable flushing liquid cart 27 at the place near the corresponding CMP apparatus 10. As shown in FIG. 2, the flushing is conducted by manually connecting the cart 27 with the filter 264 and then washing the end portion 254a of the delivery line 254 while the other portion of the delivery line 254 still remains unflushed for preventing the slurry source pipe 23 from contaminations. The movable flushing liquid cart 27 will forward to the next line when the flushing of the delivery line 254 is executed.

Since the conventional method for flushing the delivery lines 251-254 has to be conducted one by one, considerable operation time is consumed, which is uneconomical. In addition, the conventional method also falls to sufficiently clean all portions of the delivery line, which inevitably leads into clogs in the unflushed portions. Therefore, it would be desirable to provide an improved slurry supply system with a novel flushing function to resolve the above-described problems.

SUMMARY OF THE INVENTION

An aspect of the present invention is to provide an improved slurry supply system with a novel flushing module, which can on-line flush the delivery lines, thereby stops using the conventional flushing liquid cart and subsequently eliminates the labor cost as well as the undesired pollution to the clean room.

Another aspect of the present invention is to provide an improved slurry supply system with a novel flushing module, which can selectively flush one of the delivery lines and concurrently keeping the other unselected delivery lines in the normal feeding configurations.

In one embodiment, the present invention provides a slurry supply system having multiple supply modules and a flushing module concurrently coupled to the multiple supply modules. Each supply module includes a slurry reservoir and at least one delivery line connecting to the slurry reservoir, wherein each delivery line is oriented toward a chemical mechanical polishing apparatus. The flushing module includes a flushing liquid reservoir and multiple flushing lines connecting to the flushing liquid reservoir, wherein each flushing line is coupled to each delivery line thereby the flush module can selectively flush one of the delivery lines.

Still another aspect of the present invention is to provide an improved slurry supply system with a novel flushing module and a contamination-free scheme, which can avoid cross contaminations between the flushing line and the slurry delivery line as well as sufficiently cleaning the entire slurry supply system.

In one embodiment, the present invention provides a slurry supply system having multiple supply modules and a flushing module concurrently coupled to the multiple supply modules. Each supply module includes a slurry pipe connecting to at least one delivery line and at least one slurry valve on where the slurry pipe and each delivery line are connected. The flushing module includes multiple flushing lines coupled to each delivery line in order to selectively flush one of the delivery lines. The flushing module further comprises at least one first flushing valve on each flushing line for directing a flushing liquid into the corresponding delivery line, and at least one second flushing valve being upstream of each first flushing valve, each second flushing valve having a drain passage to discharge a leakage caused by closing the second flushing valve to stop the flushing liquid flowing into the corresponding delivery line.

In another embodiment, the present invention provides a slurry supply system having multiple supply modules and a flushing module concurrently coupled to the multiple supply modules. Each supply module includes a slurry reservoir, a slurry pipe, and at least one delivery line connecting to the slurry reservoir through the slurry pipe, wherein at least one slurry valve are on where the slurry pipe and each delivery line are connected. The flushing module includes multiple flushing lines coupled to each delivery line in order to selectively flush delivery lines. Each supply module further comprises at least one conduit branched from each delivery line and downstream of the slurry valve corresponding to the delivery line, the conduit being fitted with a delivery valve for discharging a leakage caused by closing the slurry valve to stop a slurry of the slurry reservoir flowing into the corresponding delivery line.

As used herein, the terms, "upstream" and "downstream" shall be construed to mean upstream and downstream, respectively, with respect to the normal flow direction of the liquid to be distributed through the supply module and the flushing module.

BRIEF DESCRIPTION OF THE DRAWINGS

The present invention will now be described, by way of examples, with reference to the accompanying drawings, in which.

DETAILED DESCRIPTION OF THE PREFERRED EMBODIMENTS

The preferred embodiments of the present invention will now be described in greater details by referring to the drawings that accompany the present application. It should be noted that the features illustrated in the drawings are not necessarily drawn to scale. Descriptions of well-known components, materials, and process techniques are omitted so as not to unnecessarily obscure the embodiments of the invention.

Figure 3:
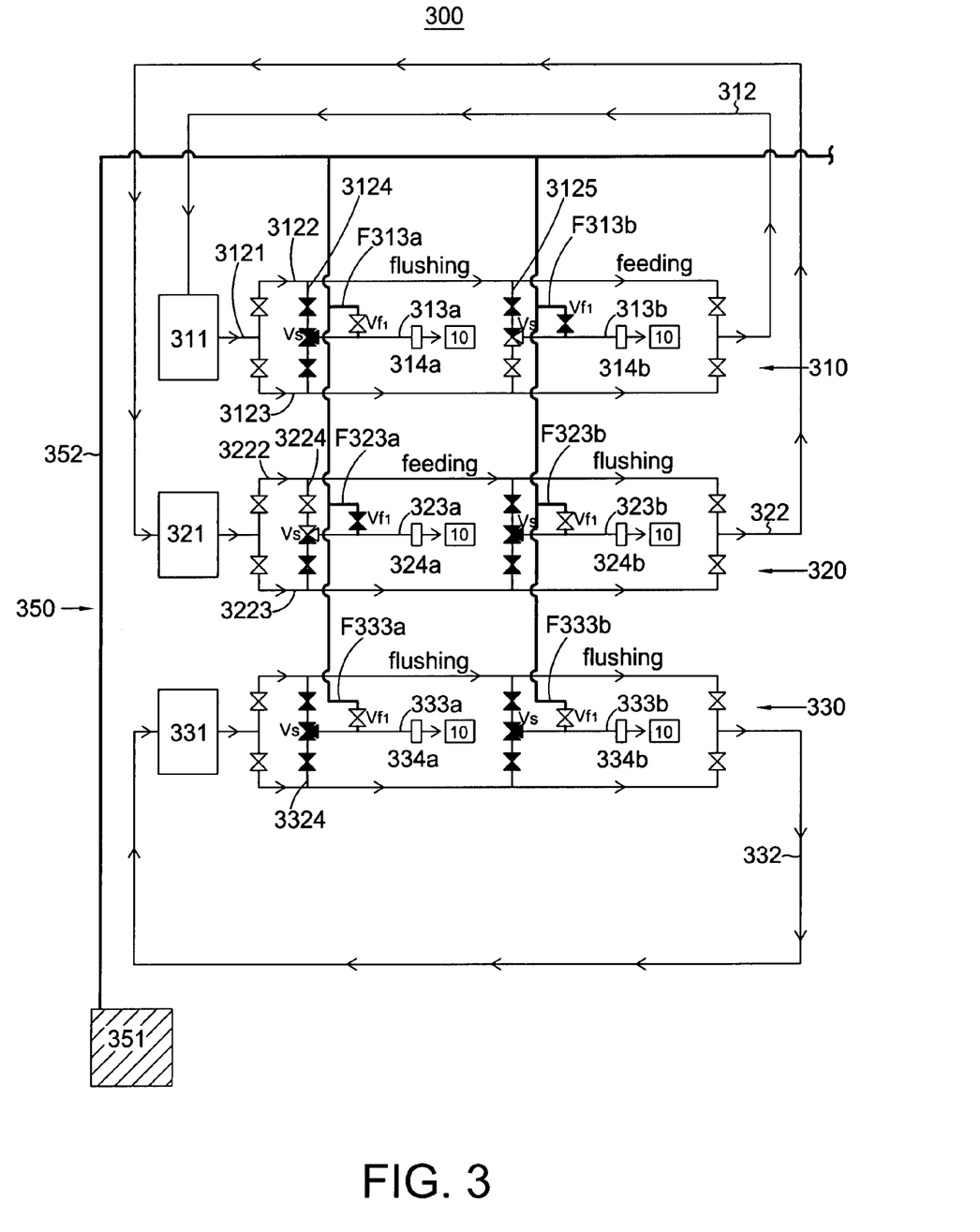
FIG. 3 schematically illustrates a slurry supply system with an on-line flushing function in accordance with a first embodiment of the present invention.

FIG. 3 schematically illustrates a first embodiment of the present invention. As shown in FIG. 3, a slurry supply system 300 includes multiple supply modules 310, 320 and 330, and a flushing module 350. The supply modules 310, 320 and 330 respectively includes slurry reservoirs 311, 321 and 331, slurry pipes 312, 322 and 332, and delivery lines 313a, 313b, 323a, 323b, 333a and 333b (referring as "313a to 333b" hereafter) which are individually oriented toward a specific CMP apparatus 10. The supply modules 310, 320 and 330 further include filters 314a, 314b, 324a, 324b, 334a, and 334b respectively on the downstream end of the delivery lines 313a to 333b for blocking the agglomerated particles before entering the corresponding CMP apparatus 10. The slurries stored in the slurry reservoirs 311, 321 and 331 may be the same or not depending upon the desires of users. The delivery lines 313a to 333b respectively connects the slurry reservoirs 311, 321 and 331 through the slurry pipes 312, 322 and 332, which are individually configured as a closed loop for circulating the slurry through the entire module. The supply modules 310, 320 and 330 further provide at least one slurry valve Vs, respectively on each connecting point of the slurry pipes 312, 322 and 332 and each of the delivery line 313a to 333b. Note that the supply modules 310, 320 and 330 are independent from each other, which means that the slurries of the slurry reservoirs 311, 321 and 331 are separately distributed through each corresponding slurry pipes 312, 322 and 332 without intercommunication.

As shown in FIG. 3, the slurry pipes 312, 322 and 332 of the first embodiment are arranged with similar pipe structures. Thus, the slurry pipes are specifically explained by way of describing one of them, for example, the slurry pipes 312. Note that the same structures of multiple slurry pipes are not necessary for another embodiments of the present invention. In other words, the multiple slurry pipes of the present invention can be different as appreciated. The slurry pipes 312 includes a main slurry line 3121 which is divided into a primary slurry line 3122 and a secondary slurry line 3123 for alternatively feeding the slurry of the slurry reservoir 311 into the delivery line 313a, which is vice-versa to apply to the delivery line 313b. Specifically, the slurry pipe 312 further includes at least one shunt line 3124 and 3125 respectively connecting the primary slurry line 3122 with the secondary slurry line 3123, each of the shunt line 3124 and 3125 corresponding to each of the delivery line 313a and 313b. In order to direct or stop the slurry into the delivery line 313a, multiple slurry valves Vs are respectively adopted on the shunt line 3124 and 3125. Accordingly, with respect to the delivery line 313b in FIG. 3, the slurry can flow there into by manipulating the slurry valve Vs to open to the way of the secondary slurry line 3123 the shunt line 3125. Another example is shown as the delivery line 323a, which the slurry can flow there into as the slurry valve Vs opening to the way of the primary slurry line 3222 and the shunt line 3224. Both of the delivery lines 313b and 323a are in normal feeding operations. Still another examples are shown as the delivery lines 313a, 323 b, 333a, and 333b, which the slurry cannot flow there into since the corresponding slurry valve Vs are closed to them. Alternatively switching the primary slurry line and the secondary slurry line for feeding slurry into the same delivery line has particularly advantages. For example, one can selectively flush one of the slurry lines (e.g. line 3122) without stopping the normal feeding operation of the corresponding delivery line (e.g. 313a) since it still works due to the other slurry line (e.g. line 3123). With respect to flushing the slurry lines, the aforementioned US Patent Application Publication No.: 2006/0043029 A1 is incorporated herein by reference. Note that in addition to the slurry valves Vs, other suitable slurry valves can also be fitted on the slurry pipes 312, 322 and 332 as appreciated.

Figure 4A:
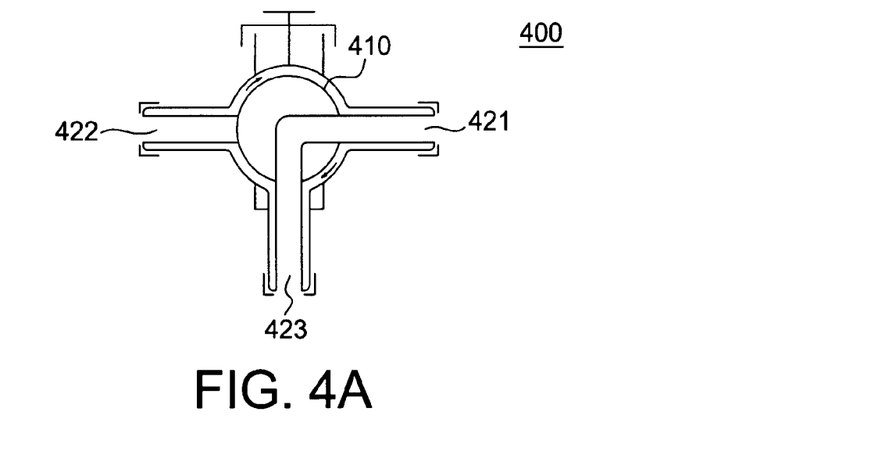
FIGS. 4A-4C schematically illustrate a cross-sectional view of a 3-way valve utilized in the present invention.
Figure 4B:
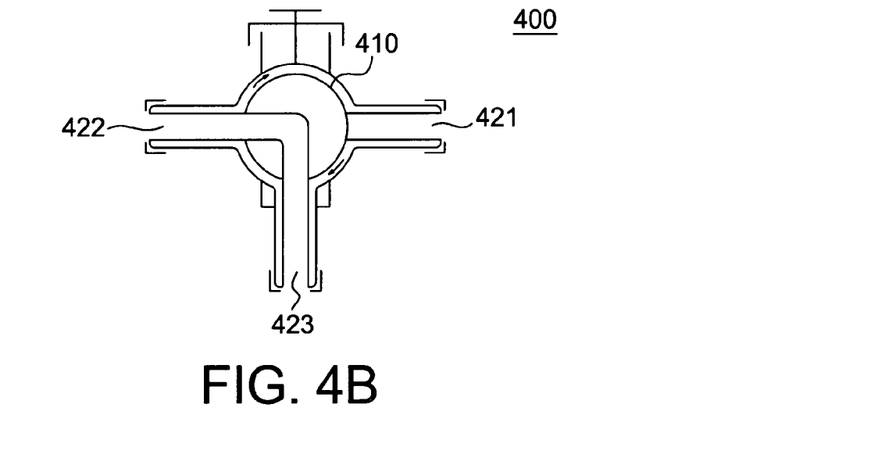
Figure 4C:
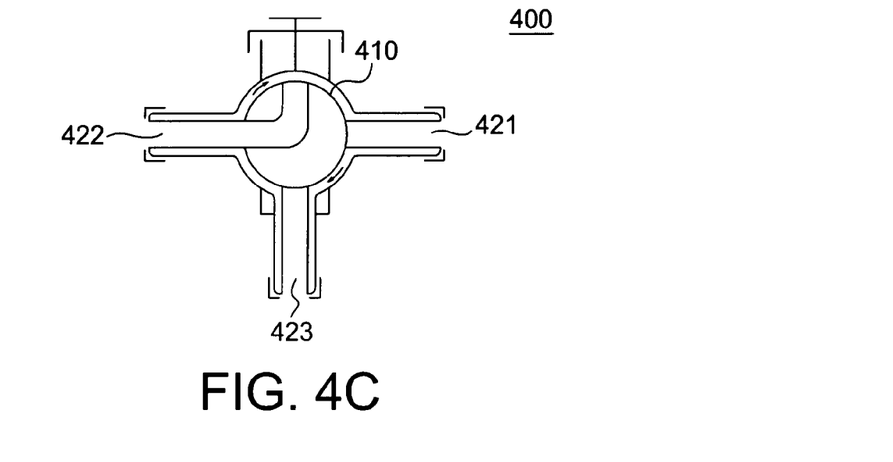

Referring to FIGS. 4A-4C, the slurry valve Vs can be a 3-way valve 400. The 3-way valve 400 is formed with a central ball 410 and three passages 421, 422 and 423. The central ball 410 is rotatable to form at least three configurations. In FIG. 4A, the passage 421 is open to 423. In FIG. 4B, the passage 422 is open to 423. In FIG. 4C, the 3-way valve 400 is closed to the passages 421 and 423.

Now returning to FIG. 3, the flushing module 350 is provided with a flushing liquid reservoir 351, a flushing distribution pipe 352, and multiple flushing lines F313a, F313b, F323a, F323b, F333a, and F333b (referring as "F313a to F313b" hereafter) respectively connecting to the flushing liquid reservoir 351 through the distribution pipe 352. Note that in FIG. 3, the flushing lines F313a to F333b are respectively coupled to the corresponding delivery line 313a to 333b. The flushing module 350 further provides multiple first flushing valves $Vf_1$ on each flushing line F313a to F333b for optionally directing a flushing liquid from the flushing liquid reservoir 351 into the corresponding delivery line 313a to 333b. The flushing liquid, stored in the flushing liquid reservoir 351, can be any suitable fluid depending upon the composition of the slurry to be flushed. Typically, deionized water or a kind of base solution such as KOH are used to be the flushing liquid. Accordingly, it should be understood that the flush module 350 can selectively flush one of the delivery lines 313a to 333b by way of an on-line manipulation via an appreciated computer controller (not shown) in association with the flush module 350. For example, as shown in FIG. 3, the delivery lines 313a, 323b, 333a, 333b are in flushing configurations as the corresponding slurry valves Vs are manipulated to close with respect to the corresponding delivery lines; and the corresponding first flushing valves $Vf_1$ are manipulated to open with respect to the corresponding delivery line. As to the delivery line 313b, 323a, they are running in normal feeding operations as the corresponding slurry valves Vs are open to them; and the corresponding first flushing valves $Vf_1$ are closed to them.

Note that the delivery lines 313a to 333b might have cross contamination problems caused by potential leakages of the aforementioned valves. As shown in FIG. 3, the slurry flowing through the delivery lines 313b and 323a might be contaminated by the flushing liquid leaked from the corresponding first flushing valve $Vf_1$. Another contamination problem might occur during the flushing configurations that the flushing liquid flowing through the delivery lines 313a, 323b, 333a and 333b could stream back to contaminate the slurry in the shunt lines 3124, 3224 and 3324 due to the leakages of the corresponding slurry valves Vs. In this aspect, a second embodiment with the on-line flushing function as well as a contamination-free scheme is accordingly provided in the present invention.

Figure 5:
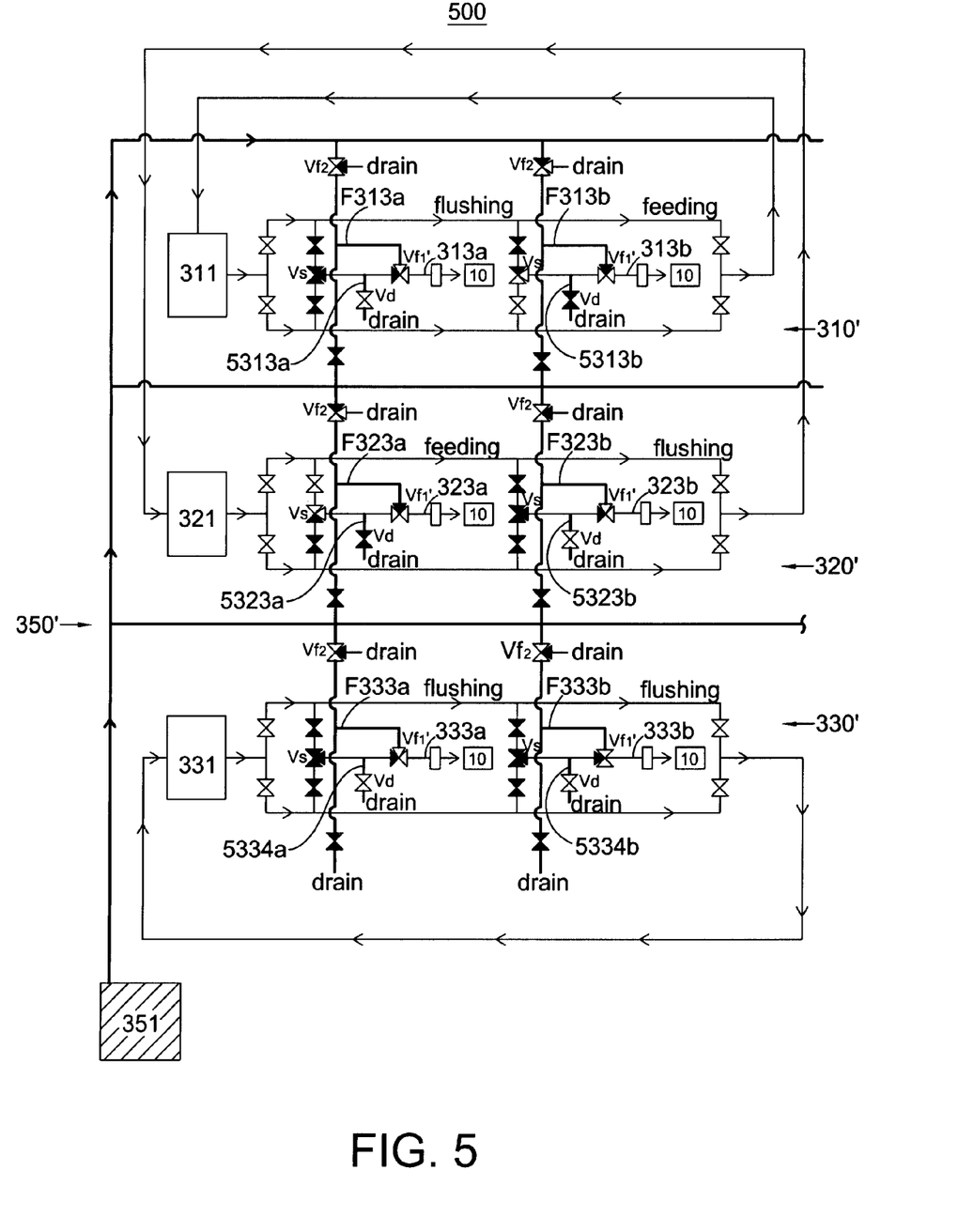
FIG. 5 schematically illustrates a slurry supply system with an on-line flushing function and a contamination-free scheme in accordance with a second embodiment of the present invention.

FIG. 5 schematically illustrates a slurry supply system 500 in accordance with the second embodiment of the present invention. As shown in FIG. 5, the entire pipe structure of the slurry system 500 is similar to the slurry system 300 of the first embodiment except the contamination-free scheme created by:

replacing the original first flushing valves $Vf_1$ with another first flushing valves $Vf_1'$, which are respectively adopted on each coupling points of the corresponding delivery line 313a to 333b and the corresponding flushing lines F313a to F333b;

adding multiple second flushing valves $Vf_2$ on the flushing distribution pipe 352 and respectively being upstream of each first flushing valve $Vf_1'$;

adding multiple conduits 5313a, 5313b, 5323a, 5323b, 5334a and 5334b respectively branched from each of the delivery lines 313a to 333b and between the corresponding slurry valve Vs and the corresponding first flushing valve $Vf_1'$; and adding multiple delivery valves Vd respectively on each of the conduits 5313a, 5313b, 5323a, 5323b, 5334a and 5334b.

Note that the first flushing valves $Vf_1'$ and the second flushing valves $Vf_2$ can be 3-way valves structured as FIGS. 4A-4C. The second flushing valve $Vf_2$ and the delivery valves Vd are formed with drain passages to the atmosphere for discharging leakages away.

The contamination-free scheme of the supply system 500 is more specifically described as following. Referring to FIG. 5, the delivery line 313a is during a flushing configuration when the corresponding slurry valve Vs is relatively closed and the corresponding first flushing valves $Vf_1'$ is relatively closed to the upstream but open to the downstream of the delivery line 313a. In the configuration, the corresponding delivery valves Vd will be open to the atmosphere so as to drain out the leakages from the corresponding slurry valve Vs and the corresponding first flushing valves $Vf_1'$. With respect to the delivery line 313b, it is during a normal feeding configuration when the corresponding first flushing valve $Vf_1'$ is closed to the corresponding flush line F313b and the corresponding second flushing valves $Vf_2$ is closed to its upstream of the flush distribution pipe 352. Thus, in the configuration, the leakages from the corresponding first flushing valve $Vf_1'$ and the corresponding second flushing valve $Vf_2$ can be drained out through the drain passage of the second flushing valve $Vf_2$. The aforementioned is vice-versa to apply to the delivery lines 323b, 334a, and 334b in the flushing configurations and the delivery line 323a in the normal feeding configurations. Accordingly, it should be understood that by way of an on-line manipulation via an appreciated computer controller (not shown) in association with the flush module 500, the flush module 500 with the abovementioned contamination-free scheme can selectively flush one of the delivery lines 313a to 333b without concerning the leakage problems.

Figure 6:
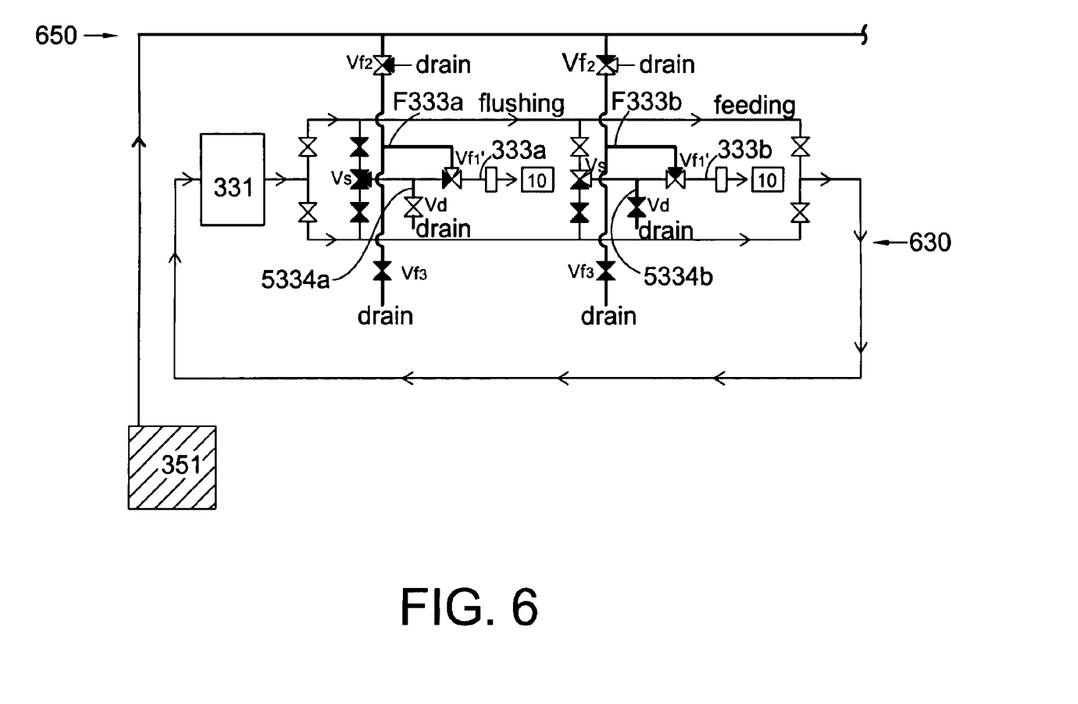
FIG. 6 schematically illustrates a slurry supply system with an on-line flushing function and a contamination-free scheme in accordance with a third embodiment of the present invention.

Although the above supply systems 300 and 500 are both configured with multiple supply modules, it should be understood that a supply system with only one supply module as shown in FIG. 6 also can enable the present invention. FIG. 6 shows a third embodiment of the present invention, which illustrates a slurry supply system 600 having a single supply module 630 and a flushing module 650 coupled to the single supply module 630. As shown in FIG. 6, the single supply module 630 and the flushing module 650 are respectively similar to the supply modules 330' and the flushing module 350' in FIG. 5. Therefore, the single supply module 630 also can perform the on-line flushing function with the contamination-free scheme as aforementioned.

Moreover, it should be noted that, for sufficiently flushing the delivery line utilized the flushing module 350, 350' and 650 of the present invention, the coupling point of each delivery line and the corresponding flushing line is preferred located as near the corresponding slurry valve as possible. In practical, the length of the delivery line from the corresponding slurry valve to the corresponding filter can be 20 meters long or even more. Therefore, it should be understood that the supply system of the present invention truly have a great benefit to the current CMP process by facilitating the flushing of the delivery line that is difficult to reach based on the prior art technology.

The detailed description of the above preferable embodiments is to describe the technical features and spirit of the present invention, and the disclosed preferable embodiments are not intended to limit the scope of the present invention. On the contrary, the preferable embodiments and its variations or equivalents all fall within the scope of the present invention. Therefore, the scope of the present invention should be most broadly explained according to the foregoing description and includes all possible variations and equivalents.

We claim:

1. A slurry supply system for chemical mechanical polishing apparatuses, the slurry supply system comprising:
   multiple supply modules, each supply module including:
   a slurry reservoir;
   at least one delivery line connecting to the slurry reservoir, the delivery line being oriented toward one of the chemical mechanical polishing apparatus;
   a slurry pipe connecting each delivery line with the slurry reservoir, wherein the slurry pipe further comprises a primary slurry line and a secondary slurry line for alternatively feeding a slurry from the slurry reservoir into one of the delivery lines; and
   at least one slurry valve on where the slurry pipe and the delivery line are connected, each slurry valve corresponding to one delivery line; and
   a flushing module coupled to each supply module, the flushing module including:
   a flushing liquid reservoir;
   multiple flushing lines connecting to the flushing liquid reservoir, each flushing line being coupled to one delivery line, and
   at least one first flushing valve on each flushing line, wherein the flush module selectively flushes one of the delivery lines by manipulating the first flushing valve corresponding to the selected delivery line.

2. The slurry supply system according to claim 1, wherein the slurry pipe further comprises at least one shunt line connecting the primary slurry line with the secondary slurry line, each shunt line corresponding to one delivery line.

3. The slurry supply system according to claim 2, wherein each slurry valve is on one shunt line.

4. The slurry supply system according to claim 1, wherein one of the slurry valves is a 3-way valve.

5. The slurry supply system according to claim 1, wherein each supply module further comprises at least one conduit branched from one delivery line, each conduit being downstream of the slurry valve corresponding to the delivery line and being fitted with a delivery valve for draining a leakage away.

6. The slurry supply system according to claim 5, wherein the leakage is caused by closing the corresponding slurry valve to stop a slurry from the slurry reservoir flowing into the delivery line.

7. The slurry supply system according to claim 1, wherein one of the first flushing valves is a 3-way valve on where one of the delivery lines and one of the flushing lines is connected.

8. The slurry supply system according to claim 1, wherein the flushing module further comprises at least one second flushing valve, each second flushing valve being upstream of one first flushing valve and having a passage for draining a leakage away.

9. The slurry supply system according to claim 8, wherein the leakage is caused by closing one of the second flushing valves to stop the flushing liquid flowing into the delivery line corresponding to the first flushing valve.

10. The slurry supply system according to claim 1, wherein the flushing line and the delivery line are coupled at a place downstream of each slurry valve.

11. The slurry supply system according to claim 1, wherein the multiple supply modules are independent from each other such that the slurries from the slurry reservoirs are separately distributed through the corresponding slurry pipe without intercommunication.

12. A slurry supply system for chemical mechanical polishing apparatuses, the slurry supply system comprising:
a supply module for supplying a slurry, including:
multiple delivery line for circulating the slurry, each delivery line being oriented toward one of the chemical mechanical polishing apparatuses;
a slurry reservoir;
a slurry pipe connecting each delivery line with the slurry reservoir, wherein the slurry pipe further comprises a primary slurry line and a secondary slurry line for alternatively feeding the slurry from the slurry reservoir into one of the delivery lines; and
at least one slurry valve on where the slurry pipe and the delivery line are connected, each slurry valve corresponding to one delivery line; and
a flushing module for providing a flushing liquid, coupled to the supply module, the flushing module including:
multiple flushing lines, each flushing line being coupled to one delivery line; and
at least one first flushing valve on each flushing line, wherein the flush module selectively flushes one of the delivery lines by manipulating the first flushing valve corresponding to the selected delivery line.

13. The slurry supply system according to claim 12, wherein the slurry pipe further comprises at least one shunt line connecting the primary slurry line with the secondary slurry line, each shunt line corresponding to one delivery line.

14. The slurry supply system according to claim 13, wherein each slurry valve is on one shunt line.

15. The slurry supply system according to claim 12, wherein one of the slurry valves is a 3-way valve.

16. The slurry supply system according to claim 12, wherein the supply module further comprises at least one conduit branched from one delivery line, each conduit being downstream of the slurry valve corresponding to the delivery line and being fitted with a delivery valve for draining a leakage away.

17. The slurry supply system according to claim 16, wherein the leakage is caused by closing the corresponding slurry valve to stop the slurry from the slurry reservoir flowing into the delivery line.

18. The slurry supply system according to claim 12, wherein one of the first flushing valves is a 3-way valve on where one of the delivery lines and one of the flushing lines is connected.

19. The slurry supply system according to claim 12, wherein the flushing module further comprises at least one second flushing valve, each second flushing valve being upstream of one first flushing valve and having a passage for draining a leakage away.

* * * * *